United States Patent [19]

Winter

[11] 4,088,460
[45] May 9, 1978

[54] PURIFYING AN AIR OR GAS STREAM CONTAINING COMBUSTIBLE VAPOROUS OR GASEOUS IMPURITIES

[75] Inventor: Karl Winter, Dortmund-Solde, Germany

[73] Assignee: Ceagfilter und Entstaubungstechnik GmbH, Dortmund, Germany

[21] Appl. No.: 738,569

[22] Filed: Nov. 3, 1976

[30] Foreign Application Priority Data

Nov. 5, 1975 Germany .............................. 2549522

[51] Int. Cl.$^2$ ............................................. B01D 53/04
[52] U.S. Cl. .................................. 55/208; 23/277 C; 55/387; 252/416
[58] Field of Search ............. 23/277 R, 277 C; 55/25, 55/27, 28, 59, 62, 74, 75, 84, 179, 208, 269, 387, 466; 252/411 R, 416, 417; 423/210

[56] References Cited

U.S. PATENT DOCUMENTS

| | | | |
|---|---|---|---|
| 3,480,558 | 11/1969 | Lum et al. | 252/416 |
| 3,853,985 | 12/1974 | Winter | 23/277 C X |
| 3,905,783 | 9/1975 | Winter et al. | 55/74 X |

Primary Examiner—Charles N. Hart
Assistant Examiner—Robert H. Spitzer
Attorney, Agent, or Firm—Herbert L. Lerner

[57] ABSTRACT

Method and apparatus for purifying an air or gas flow of combustible vaporous or gaseous impurities by passing air or gas through an adsorption filter, desorbing the filter by passing a heated inert gas, and prior to passing the hot inert gas through the adsorption filter, passing a cold protective gas through the adsorption zone thereby preventing undesired ignition of the desorbate and the burning of carbon. Provision is made for spaced closing elements at the gas inlet and the gas outlet of the adsorption chamber with introduction of protective gas in the interspace between the closing elements.

2 Claims, 1 Drawing Figure

U.S. Patent  May 9, 1978  4,088,460
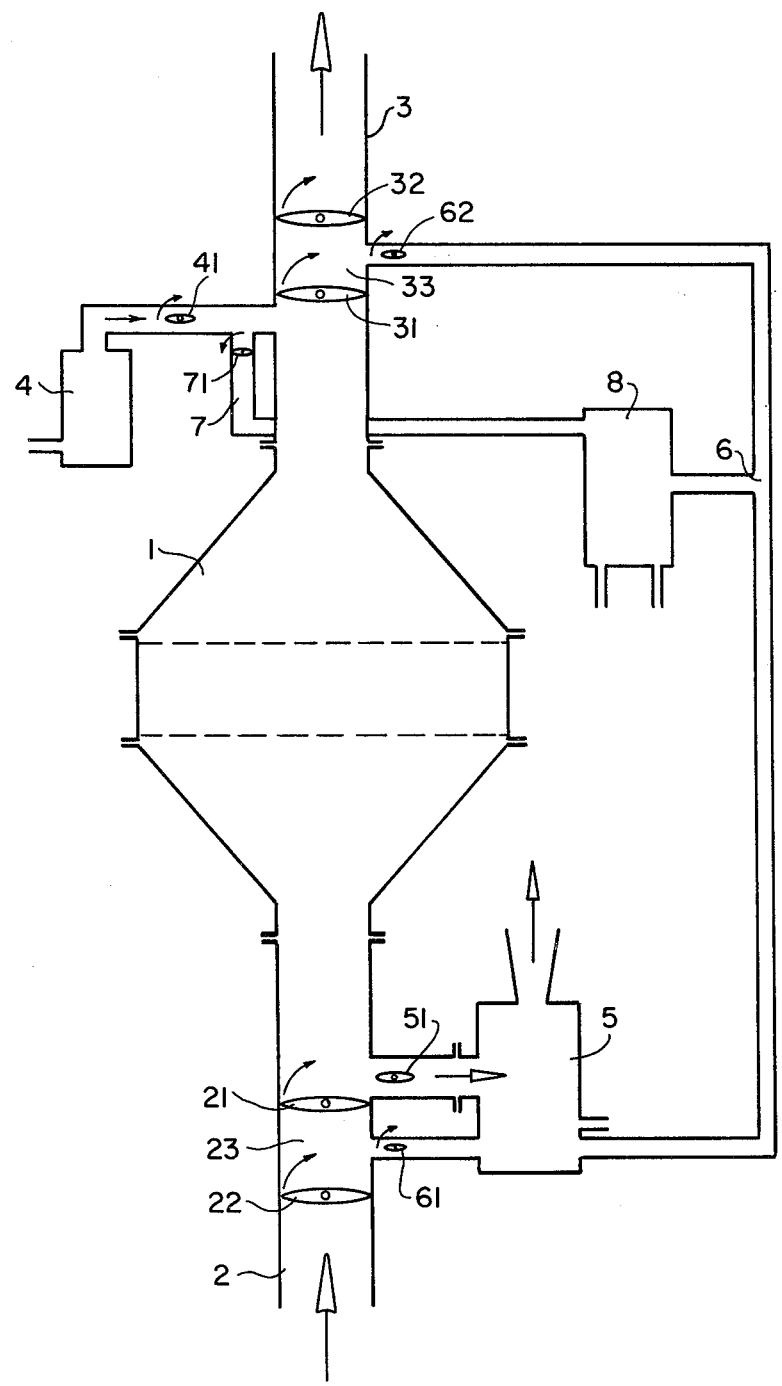

PURIFYING AN AIR OR GAS STREAM CONTAINING COMBUSTIBLE VAPOROUS OR GASEOUS IMPURITIES

CROSS-REFERENCES TO RELATED APPLICATIONS

U.S. application Ser. No. 738,537, filed for Method and Apparatus for the Selective Adsorption of Vaporous or Gaseous Impurities from other Gases, on Nov. 3, 1976, Attorney's Docket No. F-6291; and U.S. application Ser. No. 738,468 filed for Apparatus for Sorption Filters and Method for Operating them, on Nov. 3, 1976, Attorney's Docket No. F-6292.

BACKGROUND OF THE INVENTION

1. Field of the Invention

This invention relates to the minimization of pollutants in the air, and, more particularly refers to a new and improved method and apparatus for purifying an air or gas flow of combustible vaporous or gaseous impurities or pollutants by means of adsorption filters.

2. Description of the Prior Art

Purifying an air or gas stream containing combustible vaporous or gaseous impurities by means of adsorption filters in which the air or gas stream is purified and which, after a certain loading with combustible impurities is reached, are desorbed by the counterflow method by means of a hot inert gas generated by stoichiometric combustion of hydrocarbons, and the desorbate carried away by the inert gas burned with added air or oxygen, as well as apparatus suited for the implementation of the method, including two combustion chambers, one of which is connected via a shut-off member to the gas discharge line on the pure-air side and the other, via a further shut-off member, to the gas supply line on the raw-air side, wherein the gas supply line as well as the gas discharge line can be shut off, is described in U.S. Pat. Nos. 3,853,985 and 3,930,803.

The purification of an air or gas stream containing combustible vaporous or gaseous impurities by means of adsorption filters in accordance with U.S. Pat. Nos. 3,853,985 and 3,930,803 was found to be practical and the adsorption filters can be desorbed in a simple and economical manner after they have reached a certain loading. Under certain conditions this procedure has certain disadvantages. In this regard it was also found that inertization by the hot inert gas which is generated by combustion of hydrocarbons in an inert gas generator does not take place fast enough if highly volatile, combustible vapors or gases are adsorbed. In the first place, an increased, undesirable carbon burn-off can be the result; in the second place undesired ignition of the desorbate within the adsorption filter can occur. Also, due to large temperature differences, difficulties were had in maintaining tightness on the shut-off members of the gas supply line and the gas discharge line.

SUMMARY OF THE INVENTION

An object of the present invention is to provide a method and apparatus for desorbing impurities from an adsorption filter while preventing undesired ignition in the adsorption chamber and improving the shut-offs at the inlet gas line and the gas discharge line.

With the foregoing and other objects in view, there is provided in accordance with the invention, method of purifying an air or gas flow of combustible vaporous or gaseous impurities involving the steps of passing the air or gas through an adsorption zone in one direction thereof to purify the air or gas, charging the zone to a predetermined level, generating a hot inert gas by stoichiometrically burning a hydrocarbon, passing the hot inert gas through the zone in a direction opposite to that of the air or gas flow to desorb the adsorbed combustible gaseous or vaporous impurities from the zone, thereby producing a mixture of a desorbate and the inert gas, and adding to the mixture sufficient oxygen to burn the desorbate in the mixture, the combination therewith of passing a cold protective gas through the adsorptive zone to cool the adsorption zone prior to passing the hot inert gas through the adsorption zone thereby preventing undesired ignition of the desorbate and the burning of carbon contained within the adsorption zone.

In accordance with the invention there is provided apparatus for purifying an air or gas flow of combustible vaporous or gaseous impurities involving an adsorption chamber, and adsorption filter disposed in the adsorption chamber, inlet means in the adsorption chamber for the introduction of an air or gas flow of combustible vaporous or gaseous impurities for passage to one side of the filter permitting the air or gas to pass therethrough and charge the filter to a predetermined level, outlet means in the adsorption chamber for the discharge of the air or gas passing through the filter and leaving the side of the filter opposite the side of introduction of the air or gas, a first gas inlet closing member on the inlet side for introduction of the air or gas containing impurities and a second gas outlet closing member on the discharge side of the air and gas for blocking the flow of the air or gas, a first burning chamber outside the adsorption chamber for generating an inert gas, connecting means for introducing the inert gas into the adsorption chamber at a point between the gas outlet closing member and the opposite side of the filter, thereby passing the inert gas through the filter in a direction of flow opposite that of the air and gas to desorb the filter and a third inert gas flow closing member to block the flow of the inert gas, the combination therewith of a protective gas generator outside the adsorption chamber for generating protective gas, connecting means for introducing the protective gas into the adsorption chamber at a point between the third inert gas flow closing member and the opposite side of the filter, and a fourth protective gas closing member to block the flow of the protective gas.

BRIEF DESCRIPTION OF THE DRAWING

Other features which are considered as characteristic for the invention are set forth in the appended claims.

Although the invention is illustrated and described herein as embodied in purifying an air or gas stream containing combustible vaporous or gaseous impurities, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing which diagrammatically illustrates an embodiment of the invention for purifying the gas flow of impurities or pollutants.

DETAILED DESCRIPTION OF THE INVENTION

Air containing combustible vaporous or gaseous impurities is passed through the adsorption zone until the adsorption filter is charged with a predetermined amount of combustible impurities and the flow of air containing the impurities is terminated. At this point the adsorption zone contains air which must be replaced before the desorption begins. The amount of air to be replaced depends on the volume of the adsorber and may vary from about 1 to about 100 $m^3$. In addition to containing air, the adsorption zone also contains combustible impurities which if highly volatile may form an explosive mixture capable of being ignited by the introduction of hot inert gas which is generally at a temperature above about 500° C. To prevent ignition, a protective gas is introduced into the adsorption zone prior to the introduction of hot inert gas and thereby destroys any explosive mixture which may occur in the adsorption zone. The protective gas should be at a temperature below the ignition temperature, generally below 200° C, and preferably below 100° C. Introduction of cold protective gas also prevents a loss of activated carbon by burnup with oxygen. The time for introduction of cold protective gas into the adsorption zone is relatively short and may vary from a few minutes to a half hour or more depending on the temperature and rate of flow of the protective gas to replace the air and volatile combustible impurities and the degree of cooling if desired in the adsorption zone. After introduction of the cold protective gas, hot inert gas is introduced into the adsorption zone without danger of explosion or undesired ignition and loss of activated carbon. Advantageously, the adsorption zone may be cooled after contact with hot inert gas by the introduction of cold protective gas into the adsorption zone prior to reintroduction of air containing combustible vaporous or gaseous impurities.

To generate the protective gas, a conventional inert gas generator, in which low-oxygen inert gas is produced by a combustion process, followed by a cooler, can be used. Similarly, the oxygen depletion may be accomplished by known molecular sieves or by activated carbon according to the pressure cycling method. Here, the entire interior of the adsorption filter as well as the interspaces between spaced elements of the shut-off members in the gas supply line and the gas discharge line are inertizised by introduction of cold protective gas before the inert gas adsorption is initiated. After the inert gas generation has been started and the transition to desorption made, the cold protective gas supply to the adsorption filter is shut off, while the cold protective gas supply to interspace between the dual elements in the form of dampers or shutters is maintained. After the desorption is completed and the production of inert gas stopped, protective gas is fed again to the adsorption filter for the time necessary for it to cool down.

Referring to the drawing, the adsorption filter 1 has the gas supply line 2 and the discharge line 3 connected thereto. Lines 2 and 3 are shut off for the desorption by means of the shut-off members containing dual damper elements 21 and 22 in line 2 as well as a pair of damper elements 31 and 32 in line 3. The interspaces 23 and 33 between the dampers 21 and 22 and the dampers 31 and 32 are connected by means of the shut-off members 61 and 62, via the line 6, which can be shut off, to the protective gas generator 8. A further line 7 which can be shut off by the shut-off member 71, also establishes a connection to the adsorption filter 1. The inlet for the protective gas to the adsorption zone can be combined with the inlet for the inert gas to the adsorption zone.

To prepare for the desorption, the shut-off dampers 21 and 22 as well as dampers 31 and 32 are closed. The shut-off members 61 and 62 are opened and the protective gas generator 8 is put in operation. If the protective gas is generated by combustion, it is cooled to temperatures below 200° C. The protective gas generator 8 contains the cooler required for this purpose. If cold protective gas generation by oxygen depletion according to the pressure-cycling method with molecular sieves or activated carbon is used, the pressure is reduced ahead of the entrance into the line 6. Intentional leakage in the shut-off dampers 22 and 32 takes care of the flushing of the inertizised valve interspaces 23 and 33. After the shut-off members 71 and 51 are opened, protective gas from the protective gas generator 8 is conducted via the line 7 into the adsorption filter 1 and flows off through the combustion chamber 5. When the inertization with the protective gas is completed, the inert gas generator 4 is ignited and the hot inert gas is conducted into the adsorption filter 1. The shut-off member 71 is closed. However, protective gas continues to be admitted to the spaces between the shutters 21 and 22 as well as shutters 31 and 32. The hot inert gas flows off with the desorbate which is subsequently burned in the combustion chamber 5 after the necessary air is supplied. After the desorption is completed, the shut-off member 71 is opened. First, the shut-off valve 41, and later also the shut-off valve 51 is closed and the adsorption filter 1 is cooled down under protective gas conditions. After the temperature of the latter has dropped to below about 100° C the shut-off dampers 21 and 22 as well as 31 and 32 can be opened again and the purification of the air or gas stream can be reinitiated.

The embodiments of the invention in which an exclusive property or privilege is claimed are defined as follows:

1. In apparatus for purifying an air or gas flow of combustible vaporous or gaseous impurities comprising an adsorption chamber, an adsorption filter disposed in said adsorption chamber, inlet means in said adsorption chamber for the introduction of an air or gas flow of combustible vaporous or gaseous impurities for passage to one side of said filter permitting said air or gas to pass therethrough and charge said filter to a predetermined level, outlet means in said adsorption chamber for the discharge of said air or gas passing through said filter and leaving the side of the filter opposite the side of introduction of said air or gas, a first gas inlet closing member on the inlet side for introduction of said air or gas containing impurities and a second gas outlet closing member on the discharge side of said air or gas for blocking the flow of said air or gas, a first burning chamber outside said adsorption chamber for generating an inert gas, connecting means for introducing said inert gas into said adsorption chamber at a point between said gas outlet closing member and said opposite side of the filter, thereby passing said inert gas through said filter in a direction of flow opposite that of said air or gas to desorb said filter and a third inert gas flow closing member to block the flow of said inert gas, the combination therewith of a protective gas generator outside said adsorption chamber for generating protective gas, connecting means for introducing said protective gas into said adsorption chamber at a point between said third inert gas flow closing member and said opposite side of the filter, and a fourth protective gas closing member to block the flow of said protective gas, and wherein said first gas inlet closing member is equipped with two spaced closing elements including connecting means for introducing said protective gas into the interspace between said two spaced gas inlet closing elements, and a fifth protective gas closing member to block the flow of said protective gas into said interspace.

2. In apparatus for purifying an air or gas flow of combustible vaporous or gaseous impurities comprising an adsorption chamber, an adsorption filter disposed in said adsorption chamber, inlet means in said adsorption chamber for the introduction of an air or gas flow of combustible vaporous or gaseous impurities for passage to one side of said filter permitting said air or gas to pass therethrough and charge said filter to a predetermined level, outlet means in said adsorption chamber for the discharge of said air or gas passing through said filter and leaving the side of the filter opposite the side of introduction of said air or gas, a first gas inlet closing member on the inlet side for introduction of said air or gas containing impurities and a second gas outlet closing member on the discharge side of said air and gas for blocking the flow of said air or gas, a first burning chamber outside said adsorption chamber for generating an inert gas, connecting means for introducing said inert gas into said adsorption chamber at a point between said gas outlet closing member and said opposite side of the filter, thereby passing said inert gas through said filter in a direction of flow opposite that of said air or gas to desorb said filter and a third inert gas flow closing member to block the flow of said inert gas, the combination therewith of a protective gas generator outside said adsorption chamber for generating protective gas, connecting means for introducing said protective gas into said adsorption chamber at a point between said third inert gas flow closing member and said opposite side of the filter, and a fourth protective gas closing member to block the flow of said protective gas, and wherein said second gas outlet closing member is equipped with two spaced closing elements including connecting means for introducing said protective gas into the interspace between said two spaced gas outlet closing elements, and a sixth protective gas closing member to block the flow of said protective gas into said interspace.

* * * * *